UNITED STATES PATENT OFFICE.

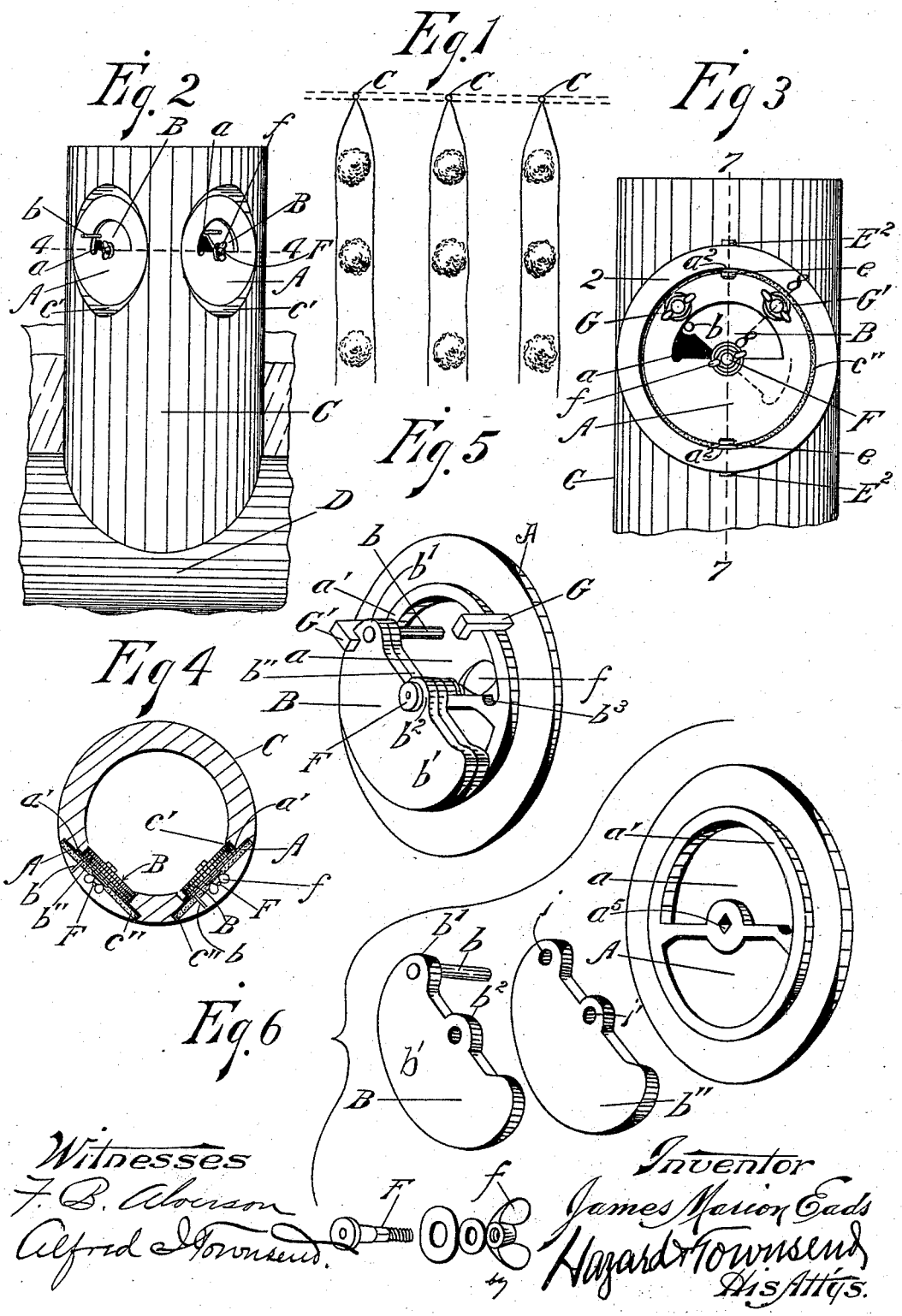

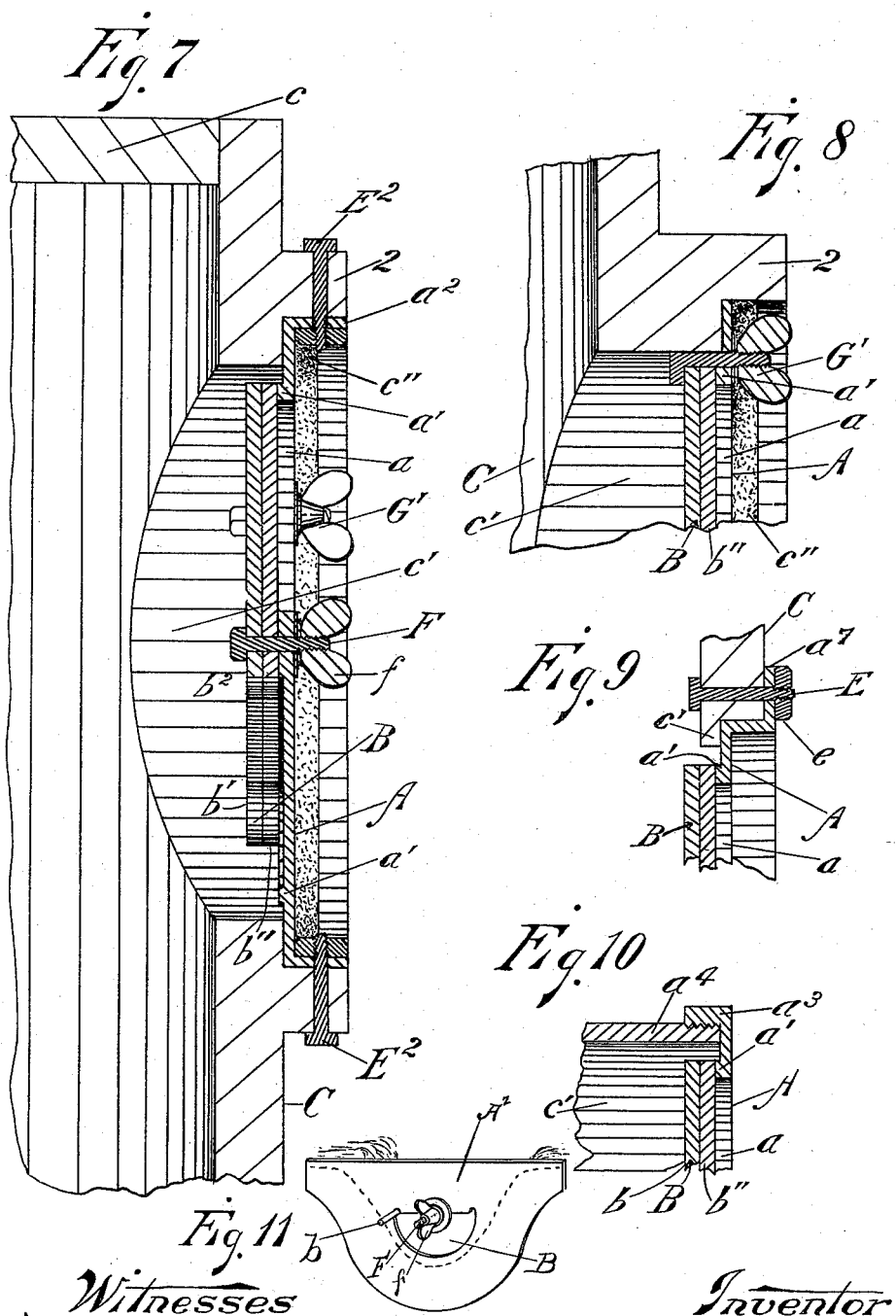

JAMES MARION EADS, OF SAN BERNARDINO COUNTY, CALIFORNIA.

IRRIGATION HEAD-GATE.

SPECIFICATION forming part of Letters Patent No. 550,710, dated December 3, 1895.

Application filed November 28, 1894. Serial No. 530,211. (No model.)

*To all whom it may concern:*

Be it known that I, JAMES MARION EADS, a citizen of the United States, residing in the county of San Bernardino, near the town of Pomona, which is in Los Angeles county, in the State of California, have invented certain new and useful Improvements in Irrigation Head-Gates, of which the following is a specification.

One object of my invention is to provide a simpler head-gate than those heretofore in use where water is delivered under pressure, and one which is adapted for use on concrete, vitrified, and other stone and earthen pipes and tiles and also upon iron pipes, and which is adapted to control the flow of water from pressure-pipes, so as to give a stream of any desired size for irrigation purposes.

Another object of my invention is to provide an improved valve which can be applied to head-gates in open ditches and which is applicable to stand-pipes and will occupy very little space, so that the stand-pipe may be low, so as to be out of the way of the teams cultivating the ground to be irrigated.

Another object of my invention is to provide for small pipes a valve of this description in which the operator can easily replace, when worn or rotten, the rubber gasket which serves to make the valve water-tight.

My invention is applicable to open ditches, but is especially adapted for use in perfect systems of irrigation in which the water is used economically and in proper quantities as distinguished from that character of irrigation in which the ground is flooded.

In systems of irrigation of this economical character it is customary to provide a separate outlet from the main line of supply-pipe for each furrow through which the water is to be carried to the orchard or vineyard to be irrigated. This is desirable in order that a small stream of water can be kept flowing for a sufficient length of time to thoroughly soak the ground without washing the ground into ruts and ditches.

The accompanying drawings illustrate my invention.

Figure 1 is a fragmental plan of an orchard provided with a system of irrigation in which my head-gates are used. Fig. 2 is a view showing one of the concrete stand-pipes connected with the main and provided with two of my improved head-gate valves. Fig. 3 is a front view showing my head-gate adapted for a large-size discharge and provided with valve-closing clamps. This head-gate is shown applied with a vitrified pipe, a fragment of which is shown. Fig. 4 is a horizontal section of the stand-pipe, looking up on line 4 4, Fig. 2. The valve-plates and valves are shown intact. Fig. 5 is a rear view of my head-gate valve-plate and valves removed from the pipe. The valve device shown in this view is of the large adaptation shown in Fig. 3. Fig. 6 shows in detail parts of one of the head-gate-valve devices shown in Fig. 4. Fig. 7 is a vertical section on line 7 7, Fig. 3. Fig. 8 is a fragmental sectional detail on line 8 8, Fig. 3, showing one of the valve-clamps. Fig. 9 is a fragmental detail showing a modified attachment for use on concrete standpipes, the same being more secure than that indicated in Fig. 4. Fig. 10 is a fragmental detail illustrating a form of attachment for use on iron pipes. Fig. 11 is a view of the head-gate as applied in an open ditch.

In the different views similar parts are indicated by the same letters, indices being used with such letters to distinguish parts which differ from like parts in other views.

My newly-invented irrigation head-gate comprises a valve-plate A, provided with a discharge opening or outlet $a$ and provided on its inner face with a valve-seat $a'$, extending around the opening, a rotatable valve B, fitted to the inner side of the valve-plate and pivoted to slide across the opening and provided with the crank $b$, which projects through the valve-opening $a$ and projects beyond the valve-plate, so as to form a handle, by which the valve can be rotated sufficiently to open and close the valve-opening $a$. The outlet and valve are preferably semicircular, as this gives a maximum opening in a given-sized pipe, and the crank is set close to, but not flush with, one edge of the valve, so that the edge of the valve will seat on the plate. I am aware that it has been proposed to make two forms of valve somewhat similar to mine, in which a rotating valve is pivoted against the inner side of a valve-plate and is arranged to be operated from the outer side of such plate; but my invention is an improvement over both of these. In one of said proposed valves a slot is provided at one side of the outlet in the valve-plate, and an arm projects from the edge of the valve to cover said slot at all times, and the crank-pin projects from this arm through the outlet. Such a construction compels the use of a much smaller outlet than I am enabled to provide for a pipe of given size. This gain in size of outlet, made possible by my invention, is of very great importance in irrigating systems where water is furnished under low pressure, because it allows a copious flow from a pipe of small diameter. In the other proposed form of valve the valve is to be operated by a central stem; but this requires the use of a crank or handle on the end of the stem and in other ways complicates the device and adds to its expense.

Another important advantage gained by the differences of construction between my valve and the former valves mentioned is that my construction enables the operator to replace the gasket in valves for small pipes without removing the valve-plate from the pipe. This is very important for the reason that the valve-plate is cemented into the stand-pipe and its removal would be very expensive.

With my invention I am enabled to easily remove the valve and replace it without disturbing the valve-plate.

My newly-invented head-gate also comprises the combination of the valve-plate and pivoted valve above set forth and the stand-pipe C, which is connected with the water-main D.

My invention also embraces other features and combinations hereinafter described and claimed.

The stand-pipe is capped over by a cap $c$, of cement or other suitable material, and an opening $c'$ is provided in the stand-pipe at a point just above the ground. The valve-plate, which is circular in form, is then placed in position in the opening $c'$ and is secured therein by cement $c''$ or other suitable means.

I deem it preferable to place the valve-plate as shown, with the valve B arranged above the pivot F, so that it will be higher from the ground than it would be if arranged reverse to the position shown, and also so that when it is desired to close the valve to shut off a stream of water the hand of the operator will be above the stream of water while operating the crank to close and open the valve.

In order to provide (in case of cement pipe) a more effectual fastening between the valve-plate and the stand-pipe, the plate A may be provided with lugs $a^7$, as indicated in Fig. 9, which project forward and outward, so as to fit upon the outside of the pipe at the top and bottom of the valve-plate. These lugs are perforated to allow bolts E to be passed therethrough to secure the same to the pipe. In practice the stand-pipe, if of cement concrete, is pierced to allow the bolts E to be passed through from the inside of the pipe and through the perforations in the lugs, there to be secured by the nuts $e$, as in Fig. 9.

With vitrified pipe the pipe is provided with a collar 2, arranged to seat the valve-plate and pierced to allow bolts to be passed therethrough. The valve-plate is provided with lugs $a^2$, fitting the inside of the collar and provided with holes for the bolts $E^2$, which secure the lugs to the collar.

In the case of iron pipe the valve-plate is provided with a screw-threaded portion $a^3$, which screws upon a collar or spout $a^4$, provided on the stand-pipe to receive it. Fig. 10 indicates the construction referred to.

The pivot-bolt F is provided at one end with a head and is preferably passed from within through the valve and valve-plate and secured by a thumb-nut $f$, so that the valve can be clamped and released by screwing and unscrewing the thumb-nut on the outside.

The valve B comprises a metal back plate $b'$ and is provided with a rubber or other elastic facing $b''$, which engages the valve-seat on the valve-plate. The valve-seat on the valve-plate is preferably ground, so that the rubber facing pressing thereagainst will form a perfectly water-tight joint.

G G' indicate two reciprocating clamps arranged to engage the edge of the valve to clamp it against the face-plate firmly when the valve is in closed position. These clamps will not ordinarily be required; but where large outlets and valves are used and a heavy pressure of water occurs it is desirable to have these clamps to prevent leakage. In the drawings I have shown clamps operated by thumb-nuts.

I usually provide each stand-pipe with two valved openings arranged quartering with each other, so that they will throw their streams at right angles to each other, thus allowing the irrigator to run two streams from each stand-pipe.

In practical operation the water presses against the inside of the valve, and this tends to hold it firmly on its seat. When it is desired to allow a stream of water to flow out, the valve is turned by means of the crank-handle to produce an opening sufficient to allow the escape of a stream of water of the desired size, and the pressure of water against the valve is sufficient to hold the valve in such position until it is forcibly changed.

For use on iron pipe the valve-plate can be provided with a rim $a^3$ to form a screw-cap, as shown in Fig. 10. This screw-cap can be screwed to the end of a T spout or elbow $a^4$, projecting from the stand-pipe. No illustration of the iron stand-pipe or of the entire elbow is made herein, for the reason that the construction and use of the screw-cap will be sufficiently understood without any further illustration.

When my invention is applied to the main pipe, the whole device, including the stand-pipe, will extend above the ground not more than ten or twelve inches, and it is therefore but very little in the way of the cultivator.

In order to allow the valve to almost fully open and to fully close the outlet $a$, the pin or handle $b$ is set in a projecting lug or lobe $b'$, which projects beyond the straight edge of the valve, and the pivot F is set in another lobe $b^2$, which projects from the straight edge of the valve. A notch $b^3$ is provided in the valve-plate at the lower straight side of the outlet to chamber the pin or handle $b$ when the valve is swung into its closed position. The pivot-pin F is cylindrical at its inner end to allow the valve and the rubber facing to rotate freely thereon and is square in cross-section between the cylindrical portion and the screw-threaded portion of the bolt to fit in the hole $a^5$ in the valve-plate, so that the pivot-bolt does not rotate in the valve-plate, and the pivot thumb-nut can be tightened and loosened without turning the valve. The rubber facing of the valve is provided with two holes $i$ $i'$ to receive the handle $b$ and pivot-pin F. When the facing is in position, as shown in Fig. 5, the pivot-pin and handle hold the facing from being displaced.

The construction of the appliance for open ditches which I have shown in Fig. 11 differs from the other forms shown, in that the valve-plate A corresponds in form to the cross-section of the ditch and forms a valved portable dam. Such valve-plate may be made of sheet-iron and simply set into the earth and arranged across the ditch. In this form of my appliance the valve is not required to be fitted so nicely to the valve-plate as is necessary in case of the head-gates used on pressure-pipes, as above detailed. This open-ditch head-gate may be used in the main head-ditch to increase the head at one part of the ditch and allow a part of the water to flow farther on through the head-ditch, and may also be used in the outlets from said head-ditch.

When the rubber gasket becomes worn or rotten, the operator can easily replace it with a new gasket. In order to do this, the thumb-nut $f$ is removed from the end of the pivot-bolt F, and the operator then grasps the handle $b$, and then can push the valve inward, thus removing the pivot-bolt from the valve-plate. Then the valve can be turned and withdrawn through the semicircular outlet, so that the operator can remove and replace the rubber gasket. After this is done the operator inserts the valve, reversing the operation just described. It is essential that the valve-handle project through the semicircular outlet. Otherwise this simple and easy removal and replacement of the valve and gasket could not be performed except in cases where the outlet is large enough to admit the hand of the operator, and that size of outlet is only possible in exceptional cases where stand-pipes of unusual size are used.

Now, having described my invention, what I claim as new, and desire to secure by Letters Patent, is—

1. The combination of the valve-plate provided with an outlet; the valve arranged upon the inside of the valve-plate and provided with a handle arranged projecting through the outlet; a pivot-pin provided with a head and passing through the valve and valve-plate to pivot the valve to the valve-plate; and a thumb-nut screwed upon the pivot-pin to clamp the valve to the valve-plate.

2. The combination of the valve-plate provided with an outlet; the valve arranged upon the inside of the valve-plate; and provided with a handle arranged projecting through the outlet; the pivot-pin passing through the valve and valve-plate to pivot the valve to the valve-plate; a thumb-nut screwed upon the pivot-pin to clamp the valve to the valve-plate; and a reciprocating clamp arranged to engage the edge of the valve to clamp it against the valve-plate when it is in its closed position.

3. The valve pivoted to the inside of the valve-plate by a pivot-pin, and comprising a metal back provided with a pivot hole and handle, and the rubber facing provided with the holes arranged to receive the handle and the pivot.

JAMES MARION EADS.

Witnesses:
JAMES R. TOWNSEND,
ALFRED I. TOWNSEND.